United States Patent
Alday

(10) Patent No.: US 7,966,921 B1
(45) Date of Patent: Jun. 28, 2011

(54) AIRCRAFT WING-PYLON INTERFACE MOUNTING APPARATUS

(75) Inventor: Nathan A. Alday, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 297 days.

(21) Appl. No.: 12/416,211

(22) Filed: Apr. 1, 2009

(51) Int. Cl.
*B64D 1/00* (2006.01)
(52) U.S. Cl. .......... 89/1.53; 89/1.54; 244/54; 244/137.4
(58) Field of Classification Search .................... 89/1.53, 89/1.54; 244/54, 137.1, 137.4, 55; 248/554–557; 60/796, 797
See application file for complete search history.

(56) References Cited

U.S. PATENT DOCUMENTS

| | | | | |
|---|---|---|---|---|
| 2,393,105 A | * | 1/1946 | Hasselhorn | 294/82.26 |
| 3,056,623 A | * | 10/1962 | Herbert | 294/82.26 |
| 3,122,056 A | * | 2/1964 | Fitch et al. | 89/1.51 |
| 3,771,416 A | * | 11/1973 | Ackerman et al. | 89/1.51 |
| 4,395,003 A | * | 7/1983 | Coutin | 244/137.4 |
| 4,412,475 A | * | 11/1983 | Hornby | 89/1.816 |
| 4,494,438 A | * | 1/1985 | Lighton et al. | 89/1.813 |
| 4,589,615 A | * | 5/1986 | Walker, Jr. | 244/137.4 |
| 4,606,517 A | * | 8/1986 | Adams | 244/137.4 |
| 4,736,669 A | * | 4/1988 | Long et al. | 89/1.819 |
| 4,829,876 A | * | 5/1989 | Witt | 89/1.53 |
| 5,108,045 A | * | 4/1992 | Law et al. | 244/54 |
| 5,476,238 A | * | 12/1995 | Parker | 244/137.4 |
| 6,152,041 A | * | 11/2000 | Harris et al. | 244/3.25 |
| 6,655,254 B1 | * | 12/2003 | Nicodemus | 89/1.54 |
| 6,688,209 B1 | * | 2/2004 | McMahon et al. | 89/1.59 |
| 7,624,947 B2 | * | 12/2009 | Dortch et al. | 244/137.4 |

FOREIGN PATENT DOCUMENTS

GB 2182125 A * 5/1987

* cited by examiner

*Primary Examiner* — Michael Carone
*Assistant Examiner* — Jonathan C Weber
(74) *Attorney, Agent, or Firm* — Christopher L. Blackburn

(57) ABSTRACT

An apparatus for interfacing an external store to an underwing pylon suspension rack on a tactical aircraft.

17 Claims, 5 Drawing Sheets

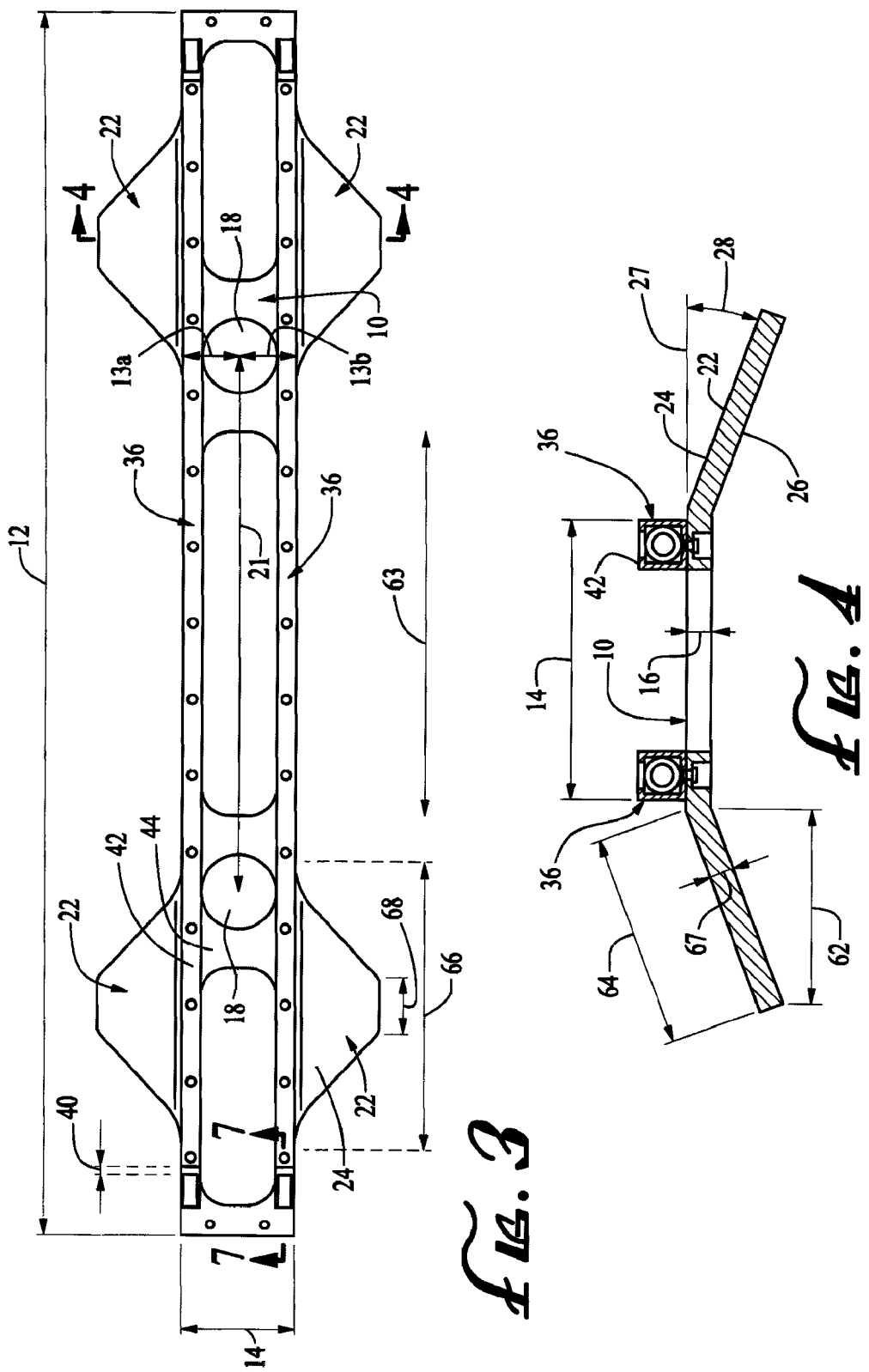

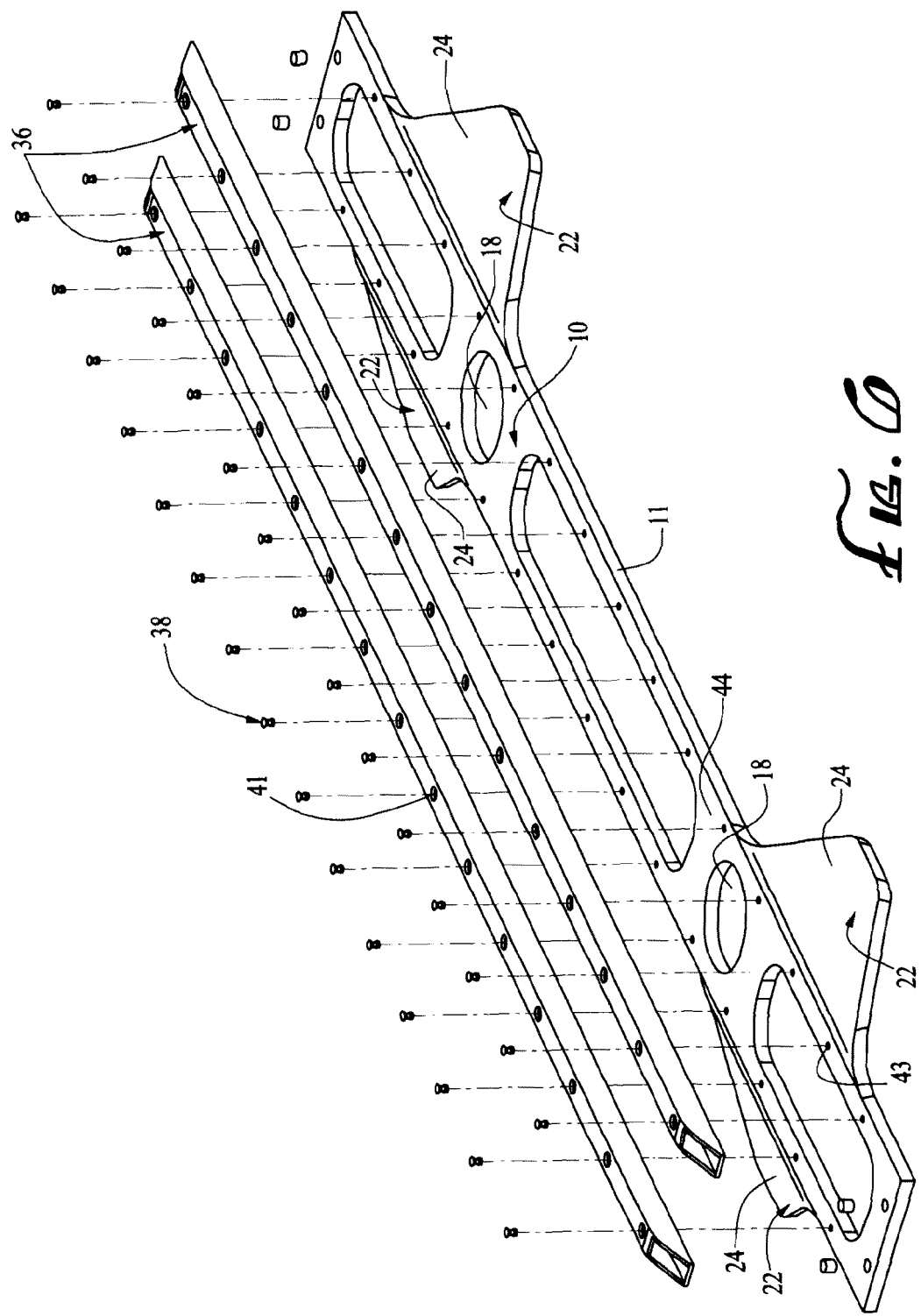

AIRCRAFT WING-PYLON INTERFACE MOUNTING APPARATUS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

FIELD OF THE INVENTION

The invention generally relates to an apparatus for interfacing an external store to an under-wing pylon of a tactical aircraft.

SUMMARY OF THE INVENTION

The invention relates to a harness for interfacing an external store to an under-wing pylon suspension rack on tactical aircraft. A harness in accordance with the principles of the invention has a rectangular body member formed of rigid material. The rectangular body member has a plurality of apertures equal in number to the number of suspension rack lugs on the external store. The apertures are dimensioned and positioned so that the suspension rack lugs on the external store can pass through the apertures to removably couple the external store to the suspension rack. Multiple metal flares extend from each long side of the rectangular body member. Each of the multiple metal flares has a lower surface and an upper surface. Each of the multiple metal flares is angled off horizontal an amount selected to allow at least a portion of the lower surface of each of the multiple metal flares to associate with a corresponding portion of the external store when the external store is interfaced with the under-wing pylon suspension rack. In embodiments of the invention, multiple conduits are attached to the rectangular body member. The multiple conduits run along a substantial length of the rectangular body member. The multiple conduits are adapted to provide structural support to the rectangular body member.

An embodiment of the invention optionally includes an electrical connection between the external store and the under-wing pylon. Where present, the electrical connection is a non-discrete electrical cable having a first end that is capped by an electrical connector adapted to electrically mate with an electrical port on the under-wing pylon and a second end capped by an electrical connector adapted to electrically mate with an electrical port on the external store. Where present, at least a portion of the non-discrete electrical cable passes through at least one of the multiple conduits.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments.

BRIEF DESCRIPTION OF THE DRAWINGS

FIG. 2 also provides a partial perspective view of an under-wing pylon and a partial perspective view of an external store that could be interfaced using a harness in accordance with the embodiments of the invention.

FIG. 3 is a planar view of a harness in accordance with the embodiments of the invention.

FIG. 4 is a front view of a harness in accordance with the embodiments of the invention.

FIG. 6 is an exploded view of a harness in accordance with the embodiments of the invention.

Figure 1:
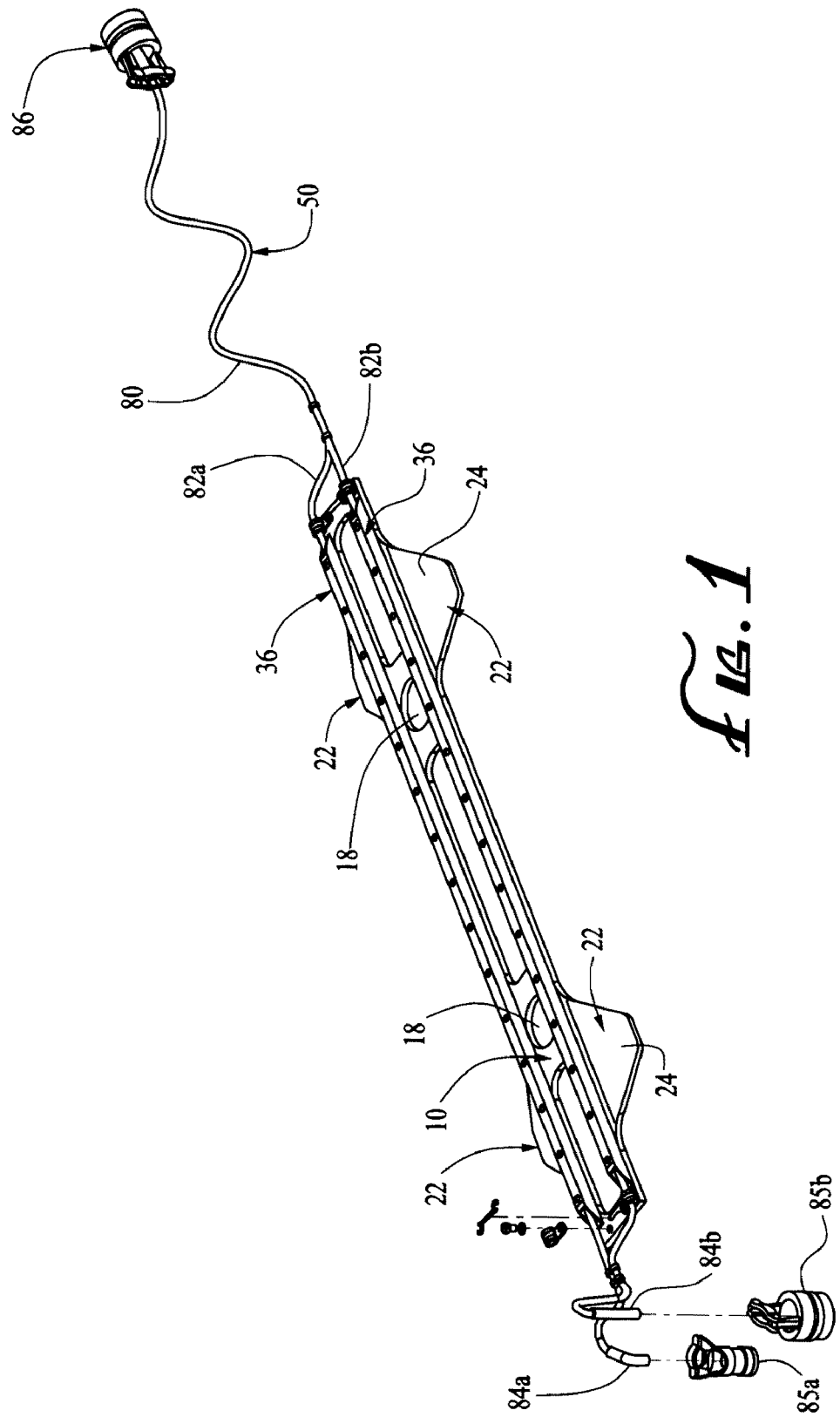
FIG. 1 is a perspective view of a harness in accordance with the embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION

The invention relates to a harness for interfacing an external store to an under-wing pylon suspension rack on a tactical aircraft. For purposes of illustration, a harness in accordance with the embodiments of the invention is sometimes described herein with reference to one possible embodiment of a harness for interfacing one possible type of external store, a U.S. Air Force Electronic Attack pod (partially illustrated in FIG. 2, 6) to an under-wing pylon (FIG. 2, 7) suspension rack 8 (FIGS. 2, 5) on one possible type of tactical aircraft, a U.S. Navy F-18. However, other embodiments of a harness in accordance with the embodiments of the invention may be used to interface a U.S. Air Force Electronic Attack pod (partially illustrated in FIG. 2, 6) to an under-wing pylon (FIG. 2, 7) suspension rack 8 (FIGS. 2, 5) on a U.S. Navy F-18 (partially illustrated in FIG. 2); further, the embodiments of the invention described herein encompass a harness that may be used to interface other U.S. Air Force external stores to U.S. Navy tactical aircraft.

A harness for interfacing an external store 6 (FIGS. 2, 5), such as, for example, a pod, to an under-wing pylon (FIG. 2, 7) suspension rack 8 (FIGS. 2, 5) on a tactical aircraft in accordance with the embodiments of the invention has a rectangular body member 10 (FIGS. 1, 3, 4, 5, 6) formed of rigid material. The rectangular body member 10 (FIGS. 1, 3, 4, 5, 6) can be formed of any rigid material, including, but not limited to, aluminum. The rectangular body member 10 (FIGS. 1, 3, 4, 5, 6) of a harness in accordance with the embodiments of the invention can have varying dimensions; however, the rectangular body member 10 (FIGS. 1, 3, 4, 5, 6) of a harness in accordance with the embodiments of the invention must be long (FIG. 3, 12 indicates rectangular body member length) enough, and wide (FIGS. 3 and 4, 14 indicate rectangular body member width) enough, to include apertures 18 (FIGS. 1, 2, 3, 6) that allow each suspension lug (FIG. 2, 20) on the external store 6 (FIGS. 2, 5) that couples to the under-wing pylon (FIG. 2, 7) suspension rack 8 (FIGS. 2, 5) to fit through an aperture 18 (FIGS. 1, 2, 3, 6) in the rectangular body member 10 (FIGS. 1, 3, 4, 5, 6). In an embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, the rectangular body member 10 (FIGS. 1, 3, 4, 5, 6) has a length (FIG. 3, 12) of about thirty two inches, a width (FIGS. 3 and 4, 14 indicate rectangular body member width) of about 2.92 inches, and a height (FIG. 4, 16) of about 0.25 inches. However, one skilled in the art would appreciate that the provided dimensions could be altered depending on many variables.

Figure 2:
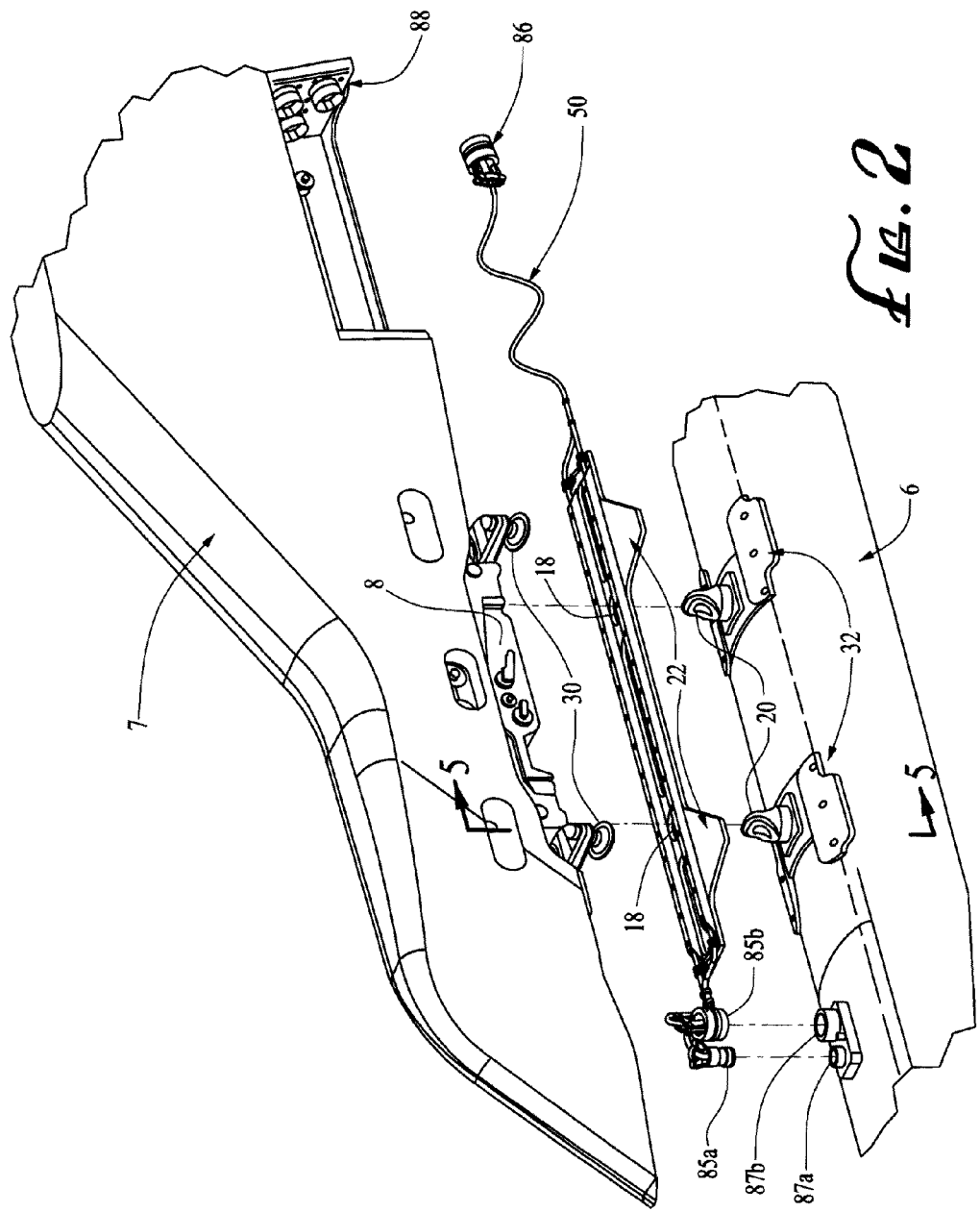
FIG. 2 is a perspective view of a harness in accordance with the embodiments of the invention.
Figure 5:
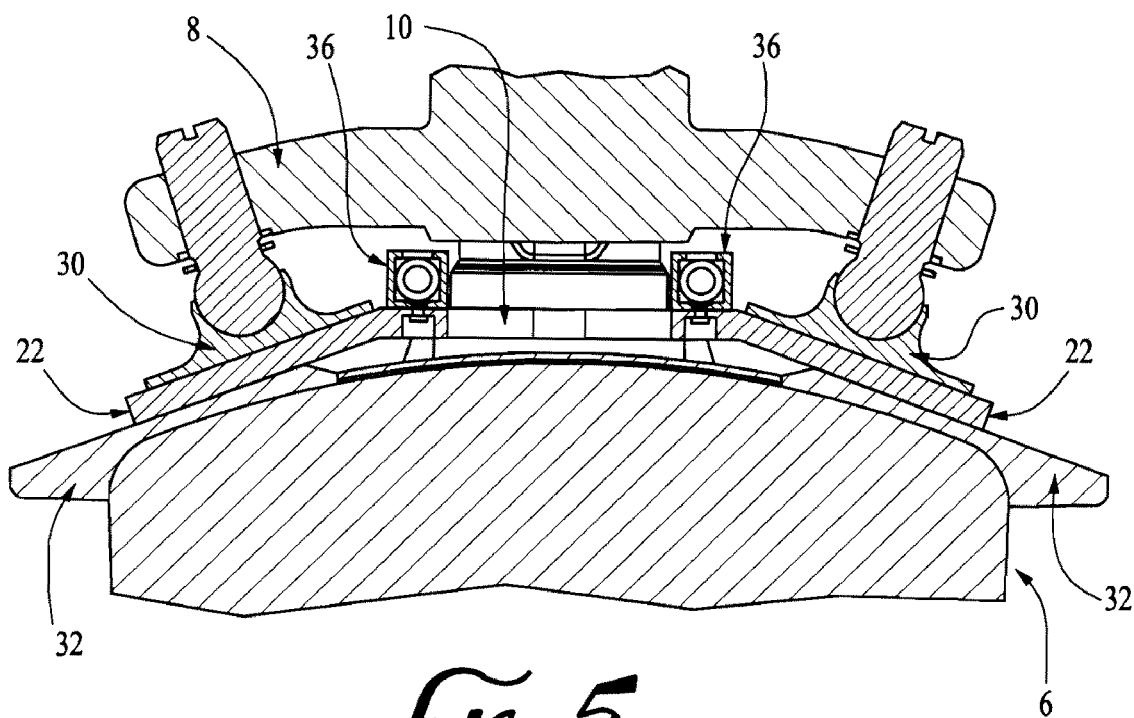
FIG. 5 is a front view of an under-wing pylon and an external store that have been interfaced using a harness in accordance with the embodiments of the invention.

In embodiments, the rectangular body member 10 (FIGS. 1, 3, 4, 5, 6) has multiple apertures 18 (FIGS. 1, 2, 3, 6) equal in number to the number of suspension lugs (FIG. 2, 20) on the external store (in the illustrated embodiment, a pod) 6 (FIGS. 2, 5). Each aperture is dimensioned to allow a suspension lug (FIG. 2, 20) to pass through it. The apertures 18 (FIGS. 1, 2, 3, 6) are positioned so that each suspension lug (FIG. 2, 20) passes through a corresponding aperture 18 (FIGS. 1, 2, 3, 6) in the rectangular body member 10 (FIGS. 1, 3, 4, 5, 6), allowing the suspension lugs (FIG. 2, 20) to be directly removably coupled to the under-wing pylon (FIG. 2, 7) suspension rack 8 (FIGS. 2, 5) when the harness is used to interface the external store with the under-wing pylon (FIG. 2, 7) suspension rack 8 (FIGS. 2, 5). In an embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, the apertures 18 (FIGS. 1, 2, 3, 6) in the rectangular body member 10 (FIGS. 1, 3, 4, 5, 6) are: 1) about 1.92 inches in diameter; 2) spaced so that the distance between the center of the two apertures (FIG. 3, 21) is about fourteen inches (about equal to the distance between the center of the two suspension lugs (FIGS. 2, 20)); and 3) positioned/configured so that the center of each aperture 18 (FIGS. 1, 2, 3, 6) is an equal distance from the long sides (FIG. 6, 11) of the rectangular body member 10 (FIGS. 1, 3, 4, 5, 6), i.e., in FIG. 3, 13a is equal to 13b.

Multiple (or a plurality of) metal flares/flanges 22 (FIGS. 1, 2, 3, 4, 5, 6) extend from each long side (FIG. 6, 11) of the rectangular body member 10 (FIGS. 1, 3, 4, 5, 6). Each of the multiple metal flares 22 (FIGS. 1, 2, 3, 4, 5, 6) has a lower surface (FIG. 4, 26) and an upper surface 24 (FIGS. 1, 3, 4, 6). At least a portion of the lower surface (FIG. 4, 26) of each of the multiple metal flares 22 (FIGS. 1, 2, 3, 4, 5, 6) associates with the external store 6 (FIGS. 2, 5) when the external store 6 (FIGS. 2, 5) is interfaced with the under-wing pylon (FIG. 2, 7) suspension rack 8 (FIGS. 2, 5) using the harness. Each of the multiple metal flares 22 (FIGS. 1, 2, 3, 4, 5, 6) is angled (FIG. 4, 28 illustrates an angle off horizontal) off horizontal (line 27 in FIG. 4 indicates horizontal) an amount selected to allow at least a portion of the lower surface (FIG. 4, 26) of each of the multiple metal flares 22 (FIGS. 1, 2, 3, 4, 5, 6) to associate with a corresponding portion (usually part of the "strong-back" portion of the external store) of the external store 6 (FIGS. 2, 5) when the external store 22 (FIGS. 1, 2, 3, 4, 5, 6) is interfaced with an under-wing pylon (FIG. 2, 7) suspension rack 8 (FIGS. 2, 5). In an embodiment of the invention, for each of the multiple metal flares 22 (FIGS. 1, 2, 3, 4, 5, 6), the lower surface (FIG. 4, 26) of the multiple metal flare 22 (FIGS. 1, 2, 3, 4, 5, 6) is angled (FIG. 4, 28) off horizontal (line 27 in FIG. 4 indicates horizontal) an amount equal to the amount off horizontal (line 27 in FIG. 4 indicates horizontal) at which the corresponding portion of the external store 6 (FIGS. 2, 5) that the lower surface (FIG. 4, 26) of the multiple metal flare 22 (FIGS. 1, 2, 3, 4, 5, 6) associates with 32 (FIGS. 2, 5) is angled, such that the lower surface (FIG. 4, 26) of the multiple metal flare 22 (FIGS. 1, 2, 3, 4, 5, 6) is flush with the external store 6 (FIGS. 2, 5) (meaning that there is no gap between the lower surface (FIG. 4, 26) of the multiple metal flare 22 (FIGS. 1, 2, 3, 4, 5, 6) and the external store 6 (FIGS. 2, 5)) along the portion of the store 6 (FIGS. 2, 5) that the multiple metal flare 22 (FIGS. 1, 2, 3, 4, 5, 6) associates with 32 (FIGS. 2, 5). In an embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, the multiple flares 22 (FIGS. 1, 2, 3, 4, 5, 6) are angled (FIG. 4, 28) twenty degrees (20°) off horizontal (line 27 in FIG. 4 indicates horizontal). However, in other embodiments, each of the multiple flares 22 (FIGS. 1, 2, 3, 4, 5, 6) can be angled (FIG. 4, 28) off horizontal (line 27 in FIG. 4 indicates horizontal) at an angle (FIG. 4, 28) less than or greater than twenty degrees (20°), and each of the multiple metal flares 22 (FIGS. 1, 2, 3, 4, 5, 6) can be angled (FIG. 4, 28) off horizontal (line 27 in FIG. 4 indicates horizontal) an amount that differs from the amount off horizontal (line 27 in FIG. 4 indicates horizontal) at which any of the other multiple metal flares 22 (FIGS. 1, 2, 3, 4, 5, 6) is/are angled (FIG. 4, 28). In the illustrated embodiment, each of the multiple metal flares 22 (FIGS. 1, 2, 3, 4, 5, 6) is substantially flat. However, where the portion of the external store 6 (FIGS. 2, 5) that the lower surface (FIG. 4, 26) of a multiple metal flare 22 (FIGS. 1, 2, 3, 4, 5, 6) associates with is not flat, it may optionally be that the multiple metal flare 22 (FIGS. 1, 2, 3, 4, 5, 6) is arched an amount corresponding to the bend of the external store 6 (FIGS. 2, 5) along the portion of the external store 6 (FIGS. 2, 5) that the lower surface (FIG. 4, 26) of the metal flare 22 (FIGS. 1, 2, 3, 4, 5, 6) associates with such that lower surface (FIG. 4, 26) of the metal flare 22 (FIGS. 1, 2, 3, 4, 5, 6) is flush with the external store 6 (FIGS. 2, 5) (meaning that there is no gap between the lower surface (FIG. 4, 26) of the multiple metal flare 22 (FIGS. 1, 2, 3, 4, 5, 6) and the external store 6 (FIGS. 2, 5)) along the portion of the store 6 (FIGS. 2, 5) that the metal flare 22 (FIGS. 1, 2, 3, 4, 5, 6) associates with 32 (FIGS. 2, 5). Each metal flare 22 (FIGS. 1, 2, 3, 4, 5, 6) is longitudinally (longitudinal direction shown in with arrow in (FIG. 3, 63)) positioned such that the under-wing pylon (FIG. 2, 7) suspension rack 8 (FIGS. 2, 5) swaybrace pads 30 (FIGS. 2, 5) associate with the upper surface 24 (FIGS. 1, 3, 4, 6) of a corresponding multiple metal flare 22 (FIGS. 1, 2, 3, 4, 5, 6) while the lower surface (FIG. 4, 26) of the multiple metal flare 22 (FIGS. 1, 2, 3, 4, 5, 6) associates with the external store 6 (FIGS. 2, 5), 32 (FIGS. 2, 5) when the harness is used to interface an external store 6 (FIGS. 2, 5) to a under-wing pylon (FIG. 2, 7) suspension rack 8 (FIGS. 2, 5). Each of the multiple metal flares 22 (FIGS. 1, 2, 3, 4, 5, 6) is constructed to allow each of the under-wing pylon (FIG. 2, 7) suspension rack 8 (FIGS. 2, 5) swaybrace pads 30 (FIGS. 2, 5) to associate with the upper surface 24 (FIGS. 1, 3, 4, 6) of one of the multiple metal flares 22 (FIGS. 1, 2, 3, 4, 5, 6) while the lower surface (FIG. 4, 26) of the multiple metal flares 22 (FIGS. 1, 2, 3, 4, 5, 6) associates with the external store 6 (FIGS. 2, 5), 32 (FIGS. 2, 5). In an embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, each of the multiple metal flares 18 (FIGS. 1, 2, 3, 6): 1) is about 0.25 inches thick (FIG. 4, 67); 2) horizontally extends (FIG. 4, 62) about two and two tenths (2.2) inches from the rectangular body member 10 (FIGS. 1, 3, 4, 5, 6); 3) has a flat portion (FIG. 4, 64) that is about two and a quarter (2.25) inches long; 4) has a width of about 7.24 inches at the base (FIG. 3, 66) of the metal flare 22 (FIGS. 1, 2, 3, 4, 5, 6), with the width narrowing to about 1.42 inches at the tip (FIG. 3, 68) of the multiple metal flare 22 (FIGS. 1, 2, 3, 4, 5, 6).

With reference to FIG. 5, which shows a U.S. Air Force Electronic Attack pod that has been interfaced with a Navy F-18 using an embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, each of the suspension rack 8 (FIGS. 2, 5) swaybrace pads 30 (FIGS. 2, 5) associates with one of the multiple metal flares 22 (FIGS. 1, 2, 3, 4, 5, 6). The association of the under-wing pylon (FIG. 2, 7) suspension rack 8 (FIGS. 2, 5) swaybrace pads 30 (FIGS. 2, 5) with the multiple metal flares 22 (FIGS. 1, 2, 3, 4, 5, 6) (and the association of the multiple metal flares 22 (FIGS. 1, 2, 3, 4, 5, 6) with the external store 6 (FIGS. 2, 5), 32 (FIGS. 2, 5)) limits vertical movement (including lateral swinging) of the external store 6 (FIGS. 2, 5) when the harness is used to interface the external store 6 (FIGS. 2, 5) to the under-wing pylon, (FIG. 2, 7), suspension rack, 8 (FIGS. 2, 5).

A harness in accordance with the embodiments of the invention has multiple conduits 36 (FIGS. 1, 3, 4, 5, 6, 7) that are attached to the rectangular body member 10 (FIGS. 1, 3, 4, 5, 6). In an embodiment, two conduits 36 (FIGS. 1, 3, 4, 5, 6, 7) are attached to the rectangular body member 10 (FIGS. 1, 3, 4, 5, 6). The conduits 36 (FIGS. 1, 3, 4, 5, 6, 7) run along a substantial (at least half) length of the top side 44 (FIGS. 3, 6) of the rectangular body member 10 (FIGS. 1, 3, 4, 5, 6). The conduits 36 (FIGS. 1, 3, 4, 5, 6, 7) are adapted to provide structural support to the rectangular body member 10 (FIGS. 1, 3, 4, 5, 6). Each conduit 36 (FIGS. 1, 3, 4, 5, 6, 7) is adapted to be a conduit for a portion of an electrical connection between the under-wing pylon (FIG. 2, 7) and the external store (pod) 6 (FIGS. 2, 5); therefore, each conduit 36 (FIGS. 1, 3, 4, 5, 6, 7) has an internal cross sectional area greater than or equal to the cross sectional area of any portion of the cable that passes through, or is partially enclosed by, the conduit 36 (FIGS. 1, 3, 4, 5, 6, 7). In an embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, the conduits 36 (FIGS. 1, 3, 4, 5, 6, 7): 1) are about 30.5 inches long; 2) have external cross sectional dimensions of about 0.5 inches by about 0.5 inches; 3) have internal cross sectional dimensions of about 0.37 inches by about 0.37 inches; 4) except for a small portion (FIG. 3, 40) of the upper wall 42 (FIGS. 3, 4, 7) (where the wall is rounded), have about 0.065 inch thick walls.

In an embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, the conduits 36 (FIGS. 1, 3, 4, 5, 6, 7) are riveted to the rectangular body member 10 (FIGS. 1, 3, 4, 5, 6); the rivets (FIG. 6, 38) are inserted into holes (FIG. 6, 43) in the rectangular body member 10 (FIGS. 1, 3, 4, 5, 6) through holes 41 (FIGS. 6, 7) in the conduits 36 (FIGS. 1, 3, 4, 5, 6, 7). However, other fastening devices, including but not limited to screws, or methods, including but not limited to welding, may be used to fasten the multiple conduits 36 (FIGS. 1, 3, 4, 5, 6, 7) to the rectangular body member 10 (FIGS. 1, 3, 4, 5, 6).

Figure 7:
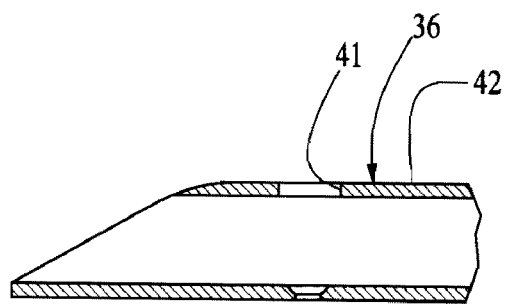
FIG. 7 is a cross-sectional side view of a conduit that could be used on a harness in accordance with the embodiments of the invention.

A harness in accordance with the embodiments of the invention optionally includes an electrical connection (an umbilical) 50 (FIGS. 1, 2) between the external store 6 (FIGS. 2, 5) and the under-wing pylon (FIG. 2, 7). Where present, the electrical connection 50 (FIGS. 1, 2) is formed of a non-discrete cable (meaning that the cable portion of the electrical connection is not formed from multiple cables electrically mated using an electrical connector, such as a plug, together) having a single cable portion (FIG. 1, 80) that is divided into multiple cables (a multiple cable portion) (FIG. 1, 82a, 82b), i.e., the multiple cables (FIG. 1, 82a, 82b) are split off from the single cable (FIG. 1, 80), and electrical connectors 86 (FIGS. 1, 2), 85a, 85b (FIGS. 1, 2). The end of the single cable portion (FIG. 1, 80) of the electrical connection 50 (FIGS. 1, 2) is capped with a connector 86 (FIGS. 1, 2) adapted 86 (FIGS. 1, 2) to electrically mate with an electrical port (FIG. 2, 88) on the under-wing pylon (FIG. 2, 7). Each end (FIG. 1, 84a, 84b) of the multiple cables (FIG. 1, 82a, 82b) comprising the multiple cable portion (FIG. 1, 82a, 82b) of the electrical connection 50 (FIGS. 1, 2) is capped with an electrical connector 85a, 85b (FIGS. 1, 2) adapted to electrically mate with an electrical port (FIG. 2, 87a, 87b) on the external store 6 (FIGS. 2, 5). A portion of each of the multiple cables (FIG. 1, 82a, 82b) in the multiple cable portion (FIG. 1, 82a, 82b) of the electrical connection 50 (FIGS. 1, 2) passes through at least one of the multiple conduits 36 (FIGS. 1, 3, 4, 5, 6, 7). In another embodiment of a harness for interfacing a U.S. Air Force Electronic Attack pod (partially illustrated in FIG. 2, 6) to an under-wing pylon (FIG. 2, 7) suspension rack 8 (FIGS. 2, 5) on a U.S. Navy F-18, the electrical connection 50 (FIGS. 1, 2) is about 74 inches in length; the multiple (two) cables (FIG. 1, 82a, 82b) in the multiple cable portion (FIG. 1, 82a, 82b) being about 49 inches, and 50 inches, long, respectively. However, the electrical connection 50 (FIGS. 1, 2), the single cable portion (FIG. 1, 80), and the multiple cables (FIG. 1, 82a, 82b) in the multiple cable portion (FIG. 1, 82a, 82b), of a harness in accordance with the embodiments of the invention may have different lengths than the lengths provided in this specification. The electrical connection 50 (FIGS. 1, 2) is long enough to electrically mate with a port on the under-wing pylon while: 1) being electrically mated with ports on the under-wing pylon; and 2) at least a portion of each of the multiple cables (FIG. 1, 82a, 82b) in the multiple cable portion (FIG. 1, 82a, 82b) of the electrical connection 50 (FIGS. 1, 2) passes through at least one of the multiple conduits 36 (FIGS. 1, 3, 4, 5, 6, 7).

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

What is claimed is:

1. A harness for interfacing an external store to an under-wing pylon suspension rack on tactical aircraft comprising:
   a rectangular body member formed of rigid material having a plurality of apertures equal in number to the number of a plurality of suspension lugs on an external store, said plurality of apertures being dimensioned and configured so that said plurality of suspension lugs on said external store passes through said plurality of apertures to removably couple said external store to an under-wing pylon suspension rack on a tactical aircraft;
   a plurality of metal flares extending from each long side of said rectangular body member, each of said plurality of metal flares having a lower surface and an upper surface;
   each of said plurality of metal flares being angled off horizontal an amount selected to allow at least a portion of said lower surface of each of said plurality of metal flares to associate with a corresponding portion of said external store when said external store is interfaced with said under-wing pylon suspension rack;
   a plurality of conduits attached to said rectangular body member;
   said plurality of conduits running along a substantial length of said rectangular body; and said plurality of conduits adapted to provide structural support to said rectangular body member.

2. The harness of claim 1, further comprising an electrical connection between said external store and said under-wing pylon, said electrical connection being a non-discrete electrical cable having a first end that is capped by an electrical connector adapted to electrically mate with an electrical port in said under-wing pylon and a second end capped by an electrical connector adapted to electrically mate with an electrical port on said external store; and at least a portion of said non-discrete electrical cable passing through at least one of said plurality of conduits.

3. The harness of claim 2, wherein said electrical cable has a single cable portion and a multiple cable portion formed of a plurality of cables that have been split off of said single cable portion, the end of said single cable portion being capped by an electrical connector adapted to electrically mate with said electrical port in said under-wing pylon, the end of each of said plurality of cables of said multiple cable portion being capped with an electrical connector adapted to plug into an electrical port on said external store; and at least a portion of each of said plurality of cables passing through at least one of said plurality of conduits.

4. The harness of claim 1, wherein said rectangular body member is about thirty two (32) inches long.

5. The harness of claim 1, wherein said rectangular body member is about seven and three tenths (7.3) inches wide.

6. The harness of claim 1, wherein said rectangular body member has a height of about one and a half (1.5) inches.

7. The harness of claim 1, wherein each of a plurality of suspension rack swaybrace pads form an association with at least one of each of said multiple metal flares when said harness is used to interface said external store to said under-wing pylon, said association of said plurality of suspension rack swaybrace pads serving to limit vertical movement of said external store when said harness is used to interface said external store to said under-wing pylon.

8. The harness of claim 1, wherein said rectangular body member is constructed of aluminum.

9. The harness of claim 1, wherein the number of said plurality of metal flares is four (4).

10. The harness of claim 2, wherein said electrical connection is about seventy four (74) inches long.

11. The harness of claim 3, wherein the number of said plurality of cables of said multiple cable portion of said electrical connection is two (2).

12. The harness of claim 11, wherein a first of said two cables is about forty nine (49) inches long and a second of said two cables is about fifty (50) inches long.

13. The harness of claim 1, wherein each of said plurality of metal flares extending from each long side of said rectangular body member is angled twenty (20) degrees off horizontal.

14. The harness of claim 1, wherein each of said plurality of metal flares extending from each long side of said rectangular body member is about one quarter (0.25) of an inch thick.

15. The harness of claim 1, wherein each of said plurality of metal flares extending from each long side of said rectangular body member horizontally extends about two and two tenths (2.2) inches from the rectangular body member.

16. The harness of claim 1, wherein each of said plurality of metal flares extending from each long side of said rectangular body member having a base width of about seven and two tenths (7.2) inches, with the width narrowing to about one and four tenths (1.4) inches at the tip of said plurality of metal flares.

17. The harness of claim 1, wherein said lower surface of each of said plurality of metal flares is arched an amount corresponding to the bend of the external store along the portion of said external store that said lower surface of each said plurality of metal flares associates with, such that said lower surface of each of said plurality of metal flares is flush with said external store along the portion of said external store with which each of said plurality of metal flares associates.

* * * * *